Patented Oct. 11, 1932

1,882,564

UNITED STATES PATENT OFFICE

STANLEY FRANCIS BIRCH AND WILLIAM DALLAS SCOTT, OF SUNBURY-ON-THAMES, ENGLAND, ASSIGNORS TO ANGLO-PERSIAN OIL COMPANY, LIMITED, OF LONDON, ENGLAND

PRODUCTION OF MONO ALKYL ETHERS OF GLYCOL

No Drawing. Application filed October 24, 1931, Serial No. 570,971, and in Great Britain October 17, 1930.

This invention relates to the production of mono alkyl ethers of glycol and their homologues by the action of alkylene oxides upon an alcohol.

It is known to carry out such a reaction in the presence of sulphuric acid or acid compounds thereof, or of the normal sulphates of bi- and polyvalent metals.

The invention has among its objects to produce mono alkyl ethers of glycols and especially of ethylene glycols, in a simple process by which a high yield is expeditiously secured.

According to the invention, the reaction between ethylene oxide and ethyl alcohol is carried out in such manner and in the presence of an alkyl sulphate, such as di-ethyl or di-methyl sulphate, in such small quantity as to cause the said di-alkyl sulphate to be catalytic in its effect, whereby the reaction is promoted and facilitated.

In carrying the invention into effect, 30 parts by volume of ethylene oxide together with 300 parts by volume of ethyl alcohol are heated under pressure within an autoclave in the presence of a small quantity of a di-alkyl sulphate such as di-ethyl or di-methyl sulphate, such for example one part by volume. The proportion is thus minute and the di-alkyl sulphate is catalytic in its effects. The reaction is carried out at a temperature of 100° C., whereby a pressure of from 50 to 60 lbs. per square inch develops. In the course of from half an hour to one hour, the pressure falls to from 20 to 25 lbs. per square inch, whereupon the application of heat ceases and the contents of the autoclave are cooled down.

The product, being mono ethyl ether of ethylene glycol is then separated by fractionation, and a yield secured of from 90 to 95%. The unused alcohol is recovered for repeated use in the treatment.

Other alcohols may be used, thus if methyl alcohol be used, a mono methyl ether of ethylene glycol is produced under like conditions.

As stated, in this process the di-alkyl sulphate is employed in such small volume or quantity, as in the example given, 1 part to 330 parts of the reaction mixture, that it has in the boiling operation a catalytic action whereby the reaction is promoted and facilitated and the time period of the heating reduced with resulting advantages.

We claim:

1. The process of making mono alkyl ethers of glycol and their homologues, which consists in causing a reaction between ethylene oxide and an alcohol in the presence of heat and pressure and a small quantity of a di-alkyl sulphate.

2. The process of making mono alkyl ethers of glycol and their homologues, which consists in causing a reaction between ethylene oxide and an alcohol in the presence of heat and pressure and a small quantity of diethyl sulphate.

3. The process of making mono alkyl ethers of glycol and their homologues, which consists in causing a reaction between ethylene oxide and an alcohol in the presence of heat and pressure and a small quantity of dimethyl sulphate.

4. The process of making mono alkyl ethers of glycol and their homologues, which consists in heating in a closed vessel a mixture of ethylene oxide and ethyl alcohol, in the proportions of about 30 parts of the ethylene oxide to 300 parts of the ethyl alcohol, at a temperature of about 100° C., and at a pressure of from 50 to 60 lbs. to the square inch, together with about 1 part of a di-alkyl sulphate acting as a reaction promoting catalyst, until the desired reaction is effected and the pressure is reduced to from 20 to 25 lbs. per square inch, and then arresting the heating action and cooling the product.

5. A process of producing mono alkyl ethers of glycol and their homologues as specified in claim 1, in which the reaction is carried out within a closed vessel at a temperature of about 100° C., under the development of a moderate pressure, the pressure being substantially reduced after the continued application of heat, whereupon the contents of the closed vessel are cooled down and the product separated by fractionation.

STANLEY FRANCIS BIRCH.
WILLIAM DALLAS SCOTT.